UNITED STATES PATENT OFFICE.

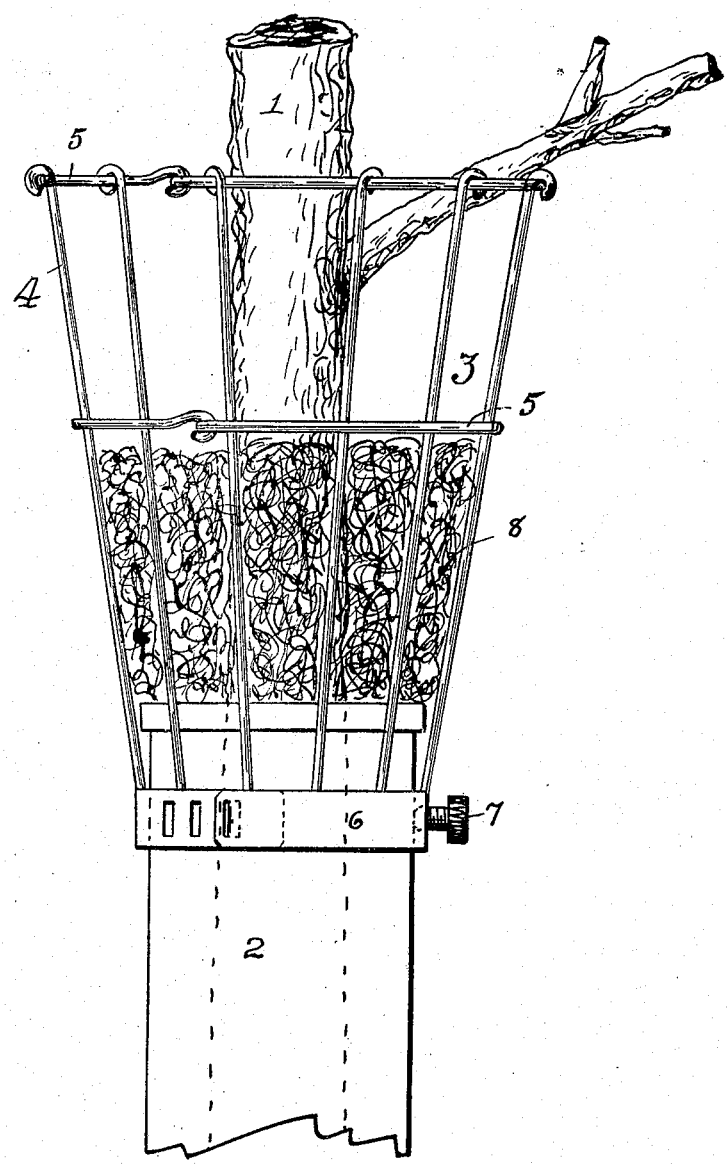

WILLIAM H. MOHR, OF READING, PENNSYLVANIA.

TREE-PROTECTOR.

933,483.     Specification of Letters Patent.     Patented Sept. 7, 1909.

Application filed July 29, 1909. Serial No. 510,180.

*To all whom it may concern:*

Be it known that I, WILLIAM H. MOHR, citizen of the United States, residing at Reading, in the county of Berks and State of Pennsylvania, have invented certain new and useful Improvements in Tree-Protectors, of which the following is a specification.

This invention relates to improvements in tree protectors, and the device is intended to act as a means of protection as against animals, as well as insects.

A further object is to form a support for the lower branches of a tree, to prevent drooping.

The invention consists of a wire basket like device of substantially cone shape, and means for securing it to the upper portion of an ordinary tree box, on which it is vertically adjustable.

The invention is more fully described in the following specification and clearly illustrated in the accompanying drawing, in which:—

The figure shows my device applied to a tree box.

The numeral 1 designates a tree and 2 a tree box of ordinary construction.

The numeral 3 designates the protector which is made of wire rods 4 held together and in proper position by means of wires 5. The device is formed with a flaring top, while the lower portion is made to fit snugly around the tree box.

The lower extremities of the wire rods are held together by means of a band 6 and in this band I place a set screw 7 by means of which the device may be secured against vertical movement on the tree box after it has been placed in the desired position. The wires that hold the wire rods together, as well as the lower band, are so made that their ends when brought together may be easily secured, as for instance, by forming a hook in each end of the wire and when joined, compressing them with a pair of tweezers.

The numeral 8 indicates a mass of wool, cotton or other like material, with which the device may be packed for the purpose of preventing insects moving up and down the tree.

The device is applied to the tree box by inclosing it with the open wire basket, and then clamping or closing the meeting ends of the wires 5 and the band 6, after which the set screw is tightened up, against the surface of the tree-box, and the device is securely attached.

The upper edge of the device, will, in a young tree, tend to support the lower branches, and prevent drooping, while in all cases, the protector serves to prevent any injury to the tree above the tree box such as is frequently caused by horses.

The device may be secured to any form of tree-box.

Having thus described my invention, what I claim and desire to secure by Letters Patent is:—

The combination of a tree box with a vertically adjustable tree protector formed of a series of vertical wire rods, annular wires for securing said rods together, and a band for securing the lower ends of said rods, thus forming an inverted cone-like receptacle; a set screw for securing the device to the tree box, and a body or mass of wool or like substance surrounding the tree inside of said device.

In testimony whereof I affix my signature, in presence of two witnesses.

WM. H. MOHR.

Witnesses:
    ED. A. KELLY,
    J. O'R. KELLY.